US006836784B2

(12) United States Patent
Perkins

(10) Patent No.: US 6,836,784 B2
(45) Date of Patent: Dec. 28, 2004

(54) EFFICIENT GREATEST COMMON DIVISOR ALGORITHM USING MULTIPRECISION ARITHMETIC

(75) Inventor: Gregory Michael Perkins, Pennington, NJ (US)

(73) Assignee: Matsushita Electric Industrial Co., Ltd., Osaka (JP)

( * ) Notice: Subject to any disclaimer, the term of this patent is extended or adjusted under 35 U.S.C. 154(b) by 558 days.

(21) Appl. No.: 09/761,213

(22) Filed: Jan. 17, 2001

(65) Prior Publication Data

US 2002/0095452 A1 Jul. 18, 2002

(51) Int. Cl.[7] ................................................ G06F 7/72
(52) U.S. Cl. ...................... 708/491; 708/200; 380/30
(58) Field of Search ............................ 708/491, 492, 708/200; 380/30

(56) References Cited

U.S. PATENT DOCUMENTS 6,209,016 B1 * 3/2001 Hobson et al. ............. 708/491
6,557,020 B1 * 4/2003 Amano et al. ............. 708/491
6,609,141 B1 * 8/2003 Montague ................... 708/491

OTHER PUBLICATIONS

J. Sorenson, "An Analysis of Lehmer's Euclidean GCD Algorith"; Department of Mathematics and Computer Science; Butler University.

* cited by examiner

Primary Examiner—D. H. Malzahn
(74) Attorney, Agent, or Firm—RatnerPrestia

(57) ABSTRACT

A method for calculating greatest common divisors uses an approximate division in its reduction step. The result of this approximate division is then compared to determine if it is valid. If not, then the method applies a correction to the first approximate division to determine corrected values that have a reduced number of bits. If, during this correction step, the result is again not valid, then another method is applied to reduce the number of bits in the values. The approximate division is applied only when the number of significant bits in the two values differ by at least a predetermined number. When the number of bits in the two values differ by less than this number, an alternative GCD algorithm is applied but only to reduce the number of bits in the intermediate values.

12 Claims, 6 Drawing Sheets

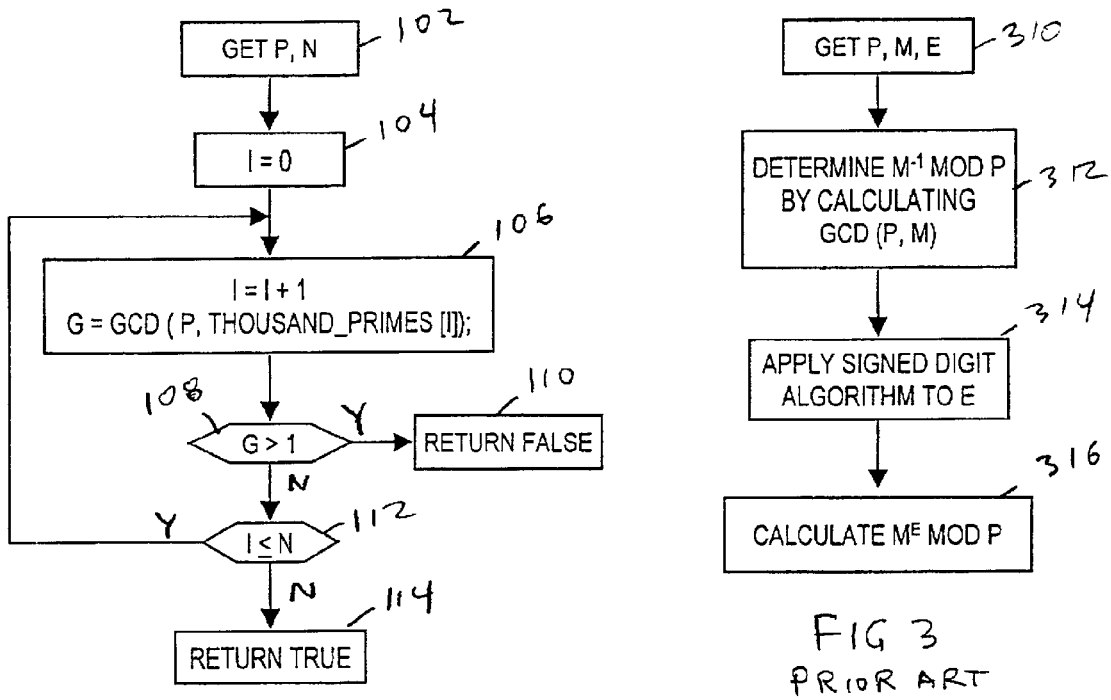
FIG 1 PRIOR ART
FIG 3 PRIOR ART
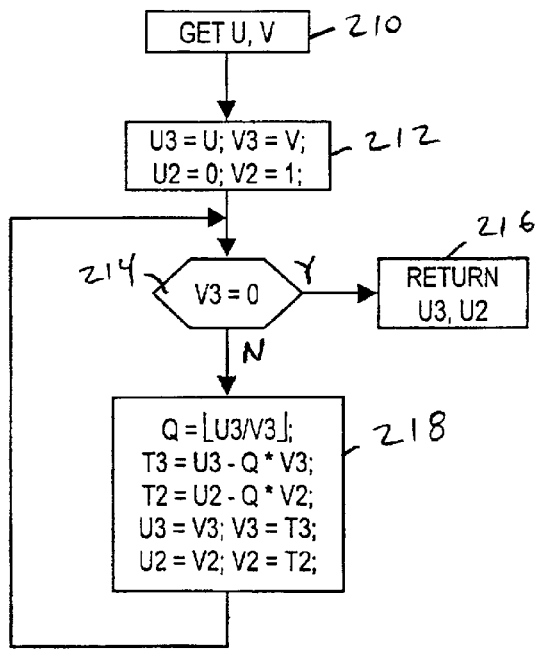
FIG 2 PRIOR ART

EFFICIENT GREATEST COMMON DIVISOR ALGORITHM USING MULTIPRECISION ARITHMETIC

BACKGROUND OF THE INVENTION

The present invention is directed to greatest common divisor algorithms and in particular to such an algorithm that uses multi-precision arithmetic and iteratively reduces the number of bits in each of the values it is testing either by performing an approximate division reduction step or by performing a novel inter-reduction step.

Modular arithmetic is used in many applications such as encryption algorithms and the generation of error correcting codes. When the modulus is a prime number, the operations of addition, subtraction, multiplication and division as well as the associative, commutative and distributive properties are defined over the set of numbers from zero to p. This set of numbers defines a Finite field modulo p, Fp.

GCD algorithms are commonly used to screen candidate large prime numbers. If a number passes the GCD test a more rigorous test is applied to determine if the number is prime. As set forth above, large prime number are important because they define Finite fields which are of interest for encryption purposes. One type of encryption algorithm encrypts data using exponentiation, relying on the inherent difficulty of the reverse of exponentiation, the discrete logarithm problem, to hold the data secure. Because encryption performed on a large Finite field is more secure than encryption performed on a small field, these algorithms work best when the exponentiation operations are carried out over a large Finite field. Thus, there is a need to identify large prime numbers. One problem with using large fields, however, is the size of the numbers being processed. Typical numbers used in data encryption have hundreds of bits. These numbers are too large to be easily handled by commonly available microprocessors that are limited to 32 or 64-bit arithmetic. As described below, calculations used in the encryption process are typically handled using multi-precision arithmetic.

FIG. 1 is a flow chart diagram of an algorithm that screens candidate prime numbers. The GCD algorithm is relatively quick and can find weed-out many candidate prime numbers having relatively small factors. The algorithm shown in FIG. 1 tests a number P to determine if it is prime relative to the first N thousand prime numbers where N is an integer. Prior to performing the algorithm shown in FIG. 1, an array THOUSAND_PRIMES [I] is prepared such that THOUSAND_PRIMES [1] contains the product of the first thousand prime numbers, THOUSAND_PRIMES [2] contains the product of the second thousand prime numbers and so on. The process begins at step 102 by obtaining the number P which is to be tested and the number N defining the number of thousand primes that P is to be tested against. At step 104 an index variable I is set to zero. At step 106, I is incremented by one and a value G is calculated where G is the greatest common divisor of P and THOUSAND_PRIMES [I]. If, at step 108, G is greater than one then P is divisible by one of the factors of THOUSAND_PRIMES [I] and is not prime. Accordingly, control transfers to step 110 where the value FALSE is returned.

If, however, at step 108 G is equal to one then P is not divisible by any of the factors of THOUSAND_PRIMES [I] and control transfers to step 112. At step 112 the variable I is compared against N. If I is less than N control transfers to step 106 where I is incremented and the greatest common divisor of P and THOUSAND_PRIMES [I] is calculated for the incremented value of I. When, at step 112, I is equal to N, the number P has been tested against the N thousand prime numbers and has been found to be relatively prime to each of these products. Thus, at step 114, the algorithm shown in FIG. 1 returns a value TRUE indicating that P is a good candidate to be a prime number. After performing the test shown in FIG. 1, the candidate prime number may be processed using a probabilistic primality testing routine, such as the Miller-Rabin algorithm to determine if it is prime.

A key element of the program shown in FIG. 1 is the greatest common divisor (GCD) algorithm. FIG. 2 is a flow chart diagram which illustrates a greatest common divisor algorithm known as Euclid's algorithm. The algorithm shown in FIG. 2 calculates the greatest common divisor of U and V where U is greater than V. The algorithm shown in FIG. 2 also calculates the inverse of V modulo U. This algorithm relies on the property that if U and V have a common divisor D so does U-V, U-2V and so on. Thus, using only subtraction, one can calculate the GCD of U and V. GCD algorithms run faster when they can combine multiple subtractions in a single step. When calculating the inverse, The GCD algorithm operates by maintaining the linear equations (1), (2) and (3)

$$U1P + U2X = U3 \tag{1}$$

$$V1P + V2X = V3 \tag{2}$$

$$T1P + T2X = T3 \tag{3}$$

Where $U \geq V$ and U3 and V3 are initially assigned the values of U and V, respectively. Upon termination, U3=GCD (P, X)=1 and U2=$X^{-1}$ MOD P. In general terms, GCD algorithms operate by repetitively reducing the number of bits in the larger value, U3, and switching the two values U3 and V3. Thus, the algorithm successively reduces the values of U3 and V3 while maintaining the linear equations. Because it maintains the values U2 and V2, the algorithm shown in FIG. 2 not only calculates the greatest common divisor of U and V but also calculates the inverse of V modulo U. That is to say, $V^{-1}$ where $V*V^{-1}=1$ modulo U. As described below, when U is a prime number, this inverse may be used to simplify division calculations performed within the Finite fields Fu. Furthermore, the variables U1, V1 and T1 do not need to be maintained because they can be determined from the other variables, for example, U1 can be determined from U2 and U3 by the identity U1=(U3−U2V)/U.

The Euclid GCD algorithm shown in FIG. 2 begins at step 210 by obtaining the values U and V. Next, at step 212 a temporary variable U3 is set equal to U and a temporary variable V3 is set equal to V. Also in step 212 variable U2 is set to zero and V2 is set one. Next, at step 214 the variable V3 is tested to determine if it is equal to zero. If not, step 218 is executed. This step calculates a value Q which is equal to the greatest integer less than U3/V3. Next, it determines a new value for V3 by storing the quantity, U3−Q*V3 into a temporary variable T3. Also at step 218, the process stores the value U2−Q*V2 into a temporary variable T2. This value is the new value for the variable V2. The value in T3 represents a reduced value of U3. Because V3 has not been reduced, however, T3 is less than V3. Consequently, the value in V3 is assigned to U3 and the value in T3 is assigned to V3. A similar operation is performed on the variables U2, V2 and T2. After step 218, control returns to step 214 where V3 is once again compared to determine if it is equal to zero.

When V3 is equal to zero the process returns the values U3 and U2. The value U3 is the greatest common divisor of U and V while the value U2 is the inverse of V modulo U (i.e. $V^{-1}$ MOD U).

As described above, a modular arithmetic operation that is used in many encryption algorithms is raising a large number M, representing a message, to a power E modulo P. In a typical encryption example the values M, E and P are each hundreds of bits in length. Operations on numbers of this size—and especially division operations—are difficult because common computer processing hardware supports at most sixty-four bit mathematical operations. Values greater than 64 bits in length are typically calculated using multi-precision arithmetic. A number, a, raised to an exponent e can always be calculated by multiplying that number by itself the number of time represented by the exponent, or in mathematical terms:

$$a^e = a*a*a \ldots e \text{ number of times.}$$

Another method, which is significantly faster, is the multiply chain algorithm. In this case, let $e = e_{n-1} e_{n-2} \ldots e_1 e_0$ be an n-bit exponent $e_i \in \{0, 1\}$, $0 \leq i \leq n-1$ and $e_{n-1} = 1$. The algorithm starts with $p_1 = a$, then $$P_{i+1} = P_i^2 \text{ if } e_{n-1-i} = 0 \text{ or } a*p_i^2 \text{ if } e_{n-1-i} = 1, \text{ where } 1 \leq i \leq n-2.$$

Several methods are known in the art to reduce either the number of multiplications used to produce efficient exponentiation of the base value.

One method known to reduce the number of multiplication is the signed digit algorithm. Using this method, the exponent is represented as a string of bits comprising the values 0 and 1. Within the bit string, sequences (or "runs") of 1's are replaced by 0's, with a 1 being placed in the next higher bit position to the most significant bit (MSB) position of the run, and "–1" being inserted in the least significant bit (LSB) position of the run. By thus efficiently recoding the exponent bit string, the expected number of multiplication operations is reduced from n/2 to n/3.

Although the signed digit algorithm reduces the number of multiplication operations needed to calculated the exponential value $M^e$ modulo P, it replaces some of the multiplication operations by division operations. As described above, division may be implemented as the multiplication by the inverse.

FIG. 3 is a flow chart diagram which illustrates an exemplary method for calculating $M^E$ modulo P. The first step in this algorithm, step 310 gets the values P, M and E. P is a large prime number, M is the message to be encoded and E is an exponent value to be used in order to encode the message. The next step in the process is to determine the inverse of M modulo P (i.e. $M^{-1}$ MOD P). This is accomplished by calculating the greatest common divisor of P and M. As P is a prime number by definition, the value U2 returned by the GCD algorithm is equal to $M^{-1}$ MOD P. Next, at step 314, the signed digit algorithm is applied to the exponent E. Finally, at step 316, the multiply-square algorithm is applied to calculate $M^E$ modulo P. As described above, the multiply-square algorithm both multiplies and divides by M. The value $M^{-1}$ MOD P is used to convert the division operation into a multiplication operation. This follows from the following equations $(a/b*b^{-1}/b^{-1}) \text{ mod } p = (a*b^{-1})/(b*b^{-1}) \text{ mod } p = (a*b^{-1})/1 \text{ mod } p$.

The Euclid algorithm is not efficient for large numbers that require multiprecision arithmetic. Thus, there is a need for an efficient GCD algorithm that calculates inverses, and operates efficiently on numbers that require multiprecision arithmetic.

SUMMARY OF THE INVENTION

The present invention is embodied in a method for calculating greatest common divisors that uses an approximate division in its reduction step. The result of this approximate division is then compared to determine if the result is negative. If it is, then an alternate method is used to reduce the number of bits in the values while maintaining the linear formulas.

According to another aspect of the invention, if the first approximate division produces a negative result, the method applies a correction to the first approximate division to determine corrected values that have a reduced number of bits. If, during this correction step, the result is still negative, then yet another method is applied to reduce the number of bits in the values.

According to another aspect of the invention, the approximate division is applied only when the number of bits in the two values differ by at least a predetermined value. When the number of bits in the two values differ by less than this number, an alternative inter-reduction step is applied.

BRIEF DESCRIPTION OF THE DRAWINGS

FIG. 1 (Prior Art) is a flow chart diagram that is useful for describing an algorithm that screens a number to determine if it is not prime in order to identify candidate numbers for more rigorous prime testing.

FIG. 2 (Prior Art) is a flow chart diagram of the Euclid GCD algorithm.

FIG. 3 (Prior Art) is a flow chart diagram which is useful for describing a method for calculating a value $M^e$ modulo P.

DETAILED DESCRIPTION

The present invention is embodied in a greatest common divisor (GCD) method that is fast even when multi-precision arithmetic is used and is also efficient at computing inverses.

Some GCD algorithms, including the algorithm disclosed by T. Jebelean, in an article entitled "A Generalization of the Binary GCD Algorithm," *ACM Symposium on Symbolic and Algebraic Computation (ISSAC)* July, 1993, pp 111–116 gain efficiency by calculating factors A and B that zero the N low-order bits of U3 and V3 when U3 and V3 are multiplied by these factors. The bit-reduced value for U3 is then calculated as $(AU3+BV3)/2^N$, where division by $2^N$ is implemented as a right-shift by N bits. When U3 and V3 are multiplied by A and B, respectively, the number of bits in the new value of U3 increases but by less than N bits. Thus, the bit shift produces a net reduction in the number of bits. One problem with algorithms of this type is that they calculate GCD (XU3, V3) instead of GCD (U3, V3). Consequently, when V3 equals zero, the returned value of the GCD may be greater than 1 even though U and V are relatively prime. This value represents the value 1 multiplied by spurious factors.

A second problem with algorithms of this type concerns the calculation of the inverse. The Jebelean algorithm uses a multi-precision addition/subtraction and shift operation to maintain the value of V2 for each iteration in which V2 is odd, greatly increasing the execution time of the algorithm. This problem requires a relatively expensive fix: to maintain equation (3) one would initially calculate $T_1U+T_2V=T_3/K^X$, where it is expensive to correct $T_2$ when accounting for the $K^X$ term. In the Jebelean algorithm, K equals 2. To maintain equation (2) one must transform $U'_1U+U'_2V=GCD'$ into $U_1U+U_2V=GCD$ where GCD|GCD' but A=(GCD'/GCD) need not divide $U'_1$ or $U'_2$. Thus, the calculation of the inverse is not a straightforward process using the Jebelean GCD algorithm.

The algorithm according to the present invention shares the first problem with the Jebelean algorithm but avoids the second problem by working with the top 2M bits of U and V. The reduction step employs approximate division if the difference in the number of bits in the values U and V is greater than a threshold and uses a GCD algorithm to reduce the number of bits in the top 2M bits of U and V by calculating factors A and B such that A(TOP2M(U))+B (TOP2M(V))<$2^M$, if the difference in the number of bits in the values U and V is less than the threshold. The inventor has determined the threshold value experimentally. This process, which uses division instead of shifting, removes the $K^X$ term and, thus, eliminates the second problem.

Figure 4:
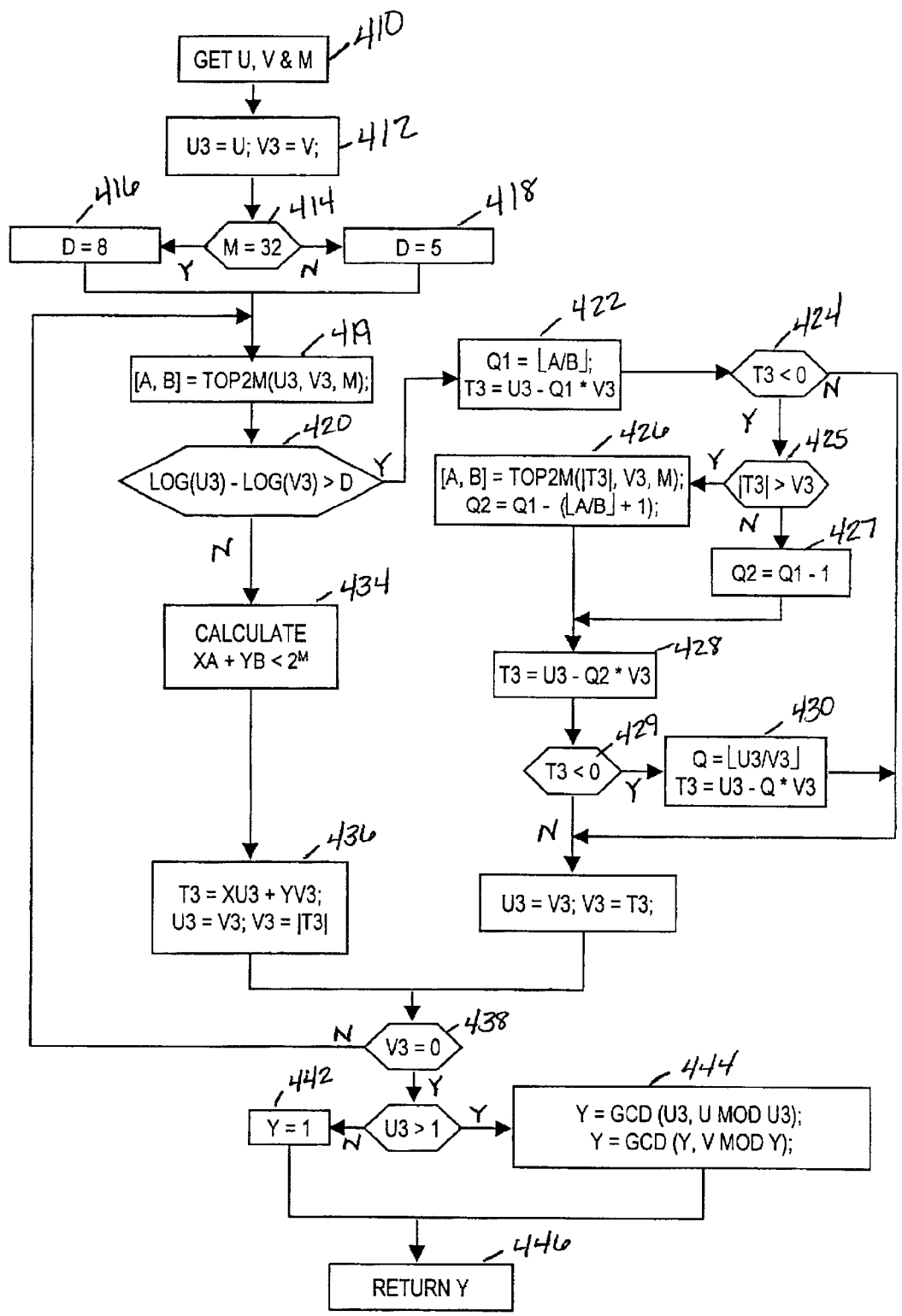
FIG. 4 is a flow chart diagram which illustrates an exemplary GCD algorithm according to the present invention.

FIG. 4 is a flow-chart diagram of a GCD algorithm that includes an embodiment of present invention. The algorithm begins at step 410 when it receives the values U, V and M. The next step, 412 sets the temporary variables U3 and V3 equal to U and V, respectively. At step 414, the method tests the value of M. In the exemplary embodiment of the invention, M may have a value of 16 (indicating that method uses 32-bit arithmetic) or 32 (indicating that the method uses 64-bit arithmetic). Responsive to M having a value of 32 or 16, steps 416 and 418 set a temporary variable D to 8 or 5, respectively. D is the threshold value that determines which reduction step is used. The inventor has determined that, when using 32 (64) bit arithmetic and the number of bits in the values U3 and V3 differs by 5 (8) or more, it is more efficient to use approximate division in the reduction step. When this difference is less than 5 (8), however, it is more efficient to use a modified GCD inter-reduction step in the algorithm.

At step 419, the process sets temporary variables A and B to be the top 2M bits of U3 and V3, respectively by invoking the routine TOP2M. This routine is described below with reference to FIG. 4A. This operation is done before branching between the reduction step and the inter-reduction step because the 2M most significant bits of U3 and V3 are used in both branches.

Figure 4A:
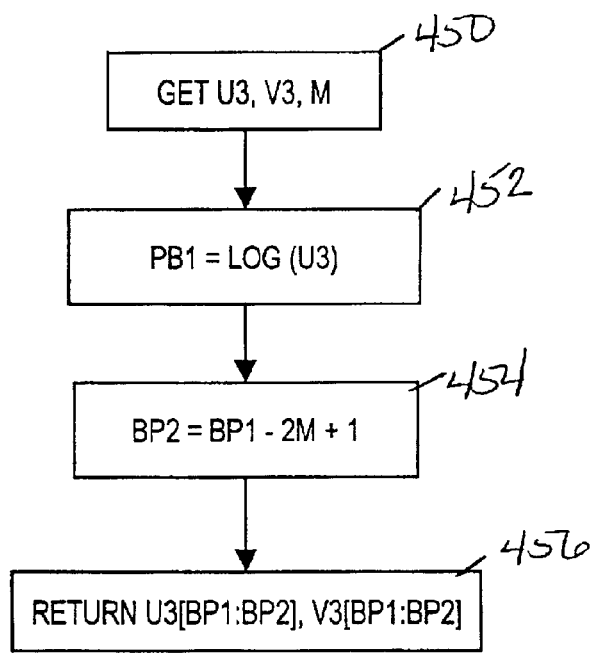
FIG. 4A is a flow-chart diagram of a TOP2M routine suitable for use in the algorithm shown in FIG. 4.

Referring to FIG. 4A, the first step in the routine TOP2M, step 450, gets the values of U3, V3 and M. Next, at step 452, the process sets a temporary variable PB1 to the bit position of the most significant non-zero bit in the value U3. Next, at step 454, the process sets a temporary variable BP2 to BP1 minus 2M plus one. Finally, at step 456, the routine returns U3 [BP1:BP2], the top 2M bits of U3, and V3 [BP1:BP2], the corresponding bits in the value V3. This routine assumes that U3 is greater than V3.

Referring again to FIG. 4, after step 419, the process determines, at step 420, if the bit position of the most significant non-zero bit in V3 differs from the position of the most significant non-zero bit in U3 by D or less. If it does not, then Step 434 performs an inter-reduction step by using the COMPUTE-XY routine to calculate values X and Y such that XA+YB<$2^M$. As described below, with reference to FIGS. 5, 6 and 7, this computation employs one of two modified GCD algorithms. Each of the GCD algorithms is modified to terminate when the GCD value is less than $2^M$. After the values X and Y have been obtained, the algorithm, at step 436, the algorithm calculates the new value for V3 by setting a temporary variable T3 to (XU3+YV3), setting U3 equal to V3 and then setting V3 equal to the absolute value of T3.

If, at step 420, the number of bits in U3 and V3 differ by more than D, the GCD algorithm according to the subject invention, at step 422, "approximately" divides U3 and V3 using only the top 2M bits of U3 (A) and V3 (B) to generate an estimated value Q1 that is approximately equal to the greatest integer less than U3 divided by V3. Also at step 422, the variable T3 is set to (U3−Q1*V3). The inventor has determined that, very often, the value Q1 is the same as would be obtained by fully calculating ⌊U3/V3⌋ using all of the bits of these values. After step 422, the next step in the algorithm, step 424, tests T3 to determine if it is less than zero. If it is, then a correction step is implemented because T3 needs to be positive (i.e. Q1 does not equal ⌊U3/V3⌋).

In this instance, the algorithm performs a correction step by first determining, at step 425, if the absolute value of T3 is greater than V3. If it is, then at step 426, the process calls TOP2M to store the top 2M bits of the absolute value of T3 and the corresponding 2M bits of V3 into the respective temporary variables A and B. Also at step 426, the process calculates a new value Q2 which is equal to Q1−(⌊A/B⌋+1).

If, at step 425, the absolute value of T3 is not greater than V3, then, at step 427, the value Q2 is calculated by simply subtracting one from Q1 at step 427. This correction results from the correction performed in step 426 because, if the absolute value of T3 is less than V3, then ⌊|T3|/V3⌋ is zero.

After step 426 or 427, step 428 computes T3 as U3−Q2*V3 and, at step 429, determines if the newly calculated value of T3 is less than zero. Because the difference in the number of bits in U3 and the number of bits in V3 is almost always less than 16 when M=16, and less than 32 when M=32. The inventor has determined empirically that when Q1 does not equal ⌊U3/V3⌋, T3 is greater than zero and, thus, Q2 equals ⌊U3/V3⌋ over 99% of the time.

For the rare instances, at step 429, when T3 is still negative, the algorithm, at step 430 sets the variable Q equal to ⌊U3/V3⌋, calculated using all of the bits in U3 and V3, and then sets T3 equal to U3 minus the quantity Q times V3. In the last step, 432, of this branch of the reduction step, the algorithm sets U3 equal to V3 and V3 equal to T3.

After step 436 or 432, the algorithm tests V3 to determine if it is equal to zero. If it is not, control returns to step 419 to extract the most significant non-zero 2M bits of the new values of U3 and V3 and perform the next reduction step or inter-reduction step, as described above.

When, at step 438, V3 is equal zero, step 440 is executed to determine if U3 is greater than 1. If U3 is greater than 1, then the result may include spurious factors. The algorithm removes any factors at step 444 by setting a temporary variable Y equal to GCD (U3, U mod U3) and then setting Y equal to the GCD (Y, V mod Y). The GCD algorithms used in this step may be any GCD algorithm because the inventors have determined that, most of the time, the number of bits in U3 is less than 2M, thus, these GCD calculations only rarely need to use multi-precision arithmetic. One exemplary GCD algorithm that may be used is the Euclid algorithm described in the above with reference to FIG. 2.

If, at step 440, U3 is found to be equal to 1, then, at step 442, the temporary variable Y is set to 1. At step 446, after step 442 or step 444, the algorithm returns the value Y as the result of the GCD calculation.

Figure 5:
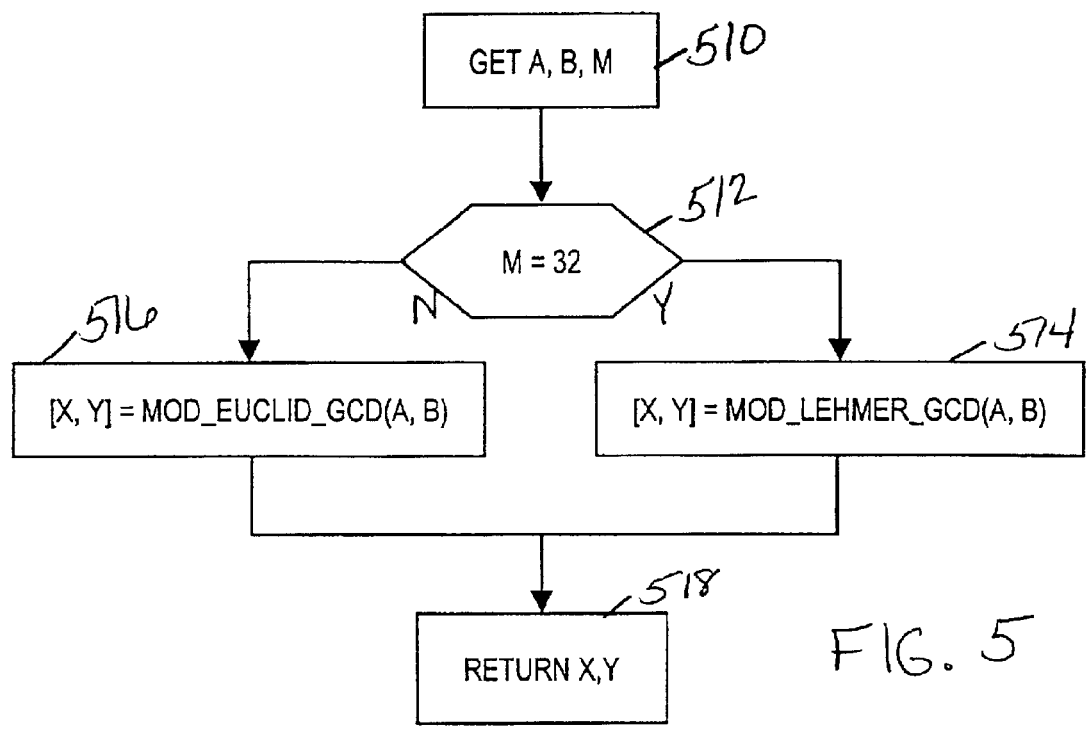
FIG. 5 is a flow-chart diagram of a CALCULATE-XY process that is used in the CALCULATE $XA+YB<2^M$ step of FIG. 4.
Figure 6:
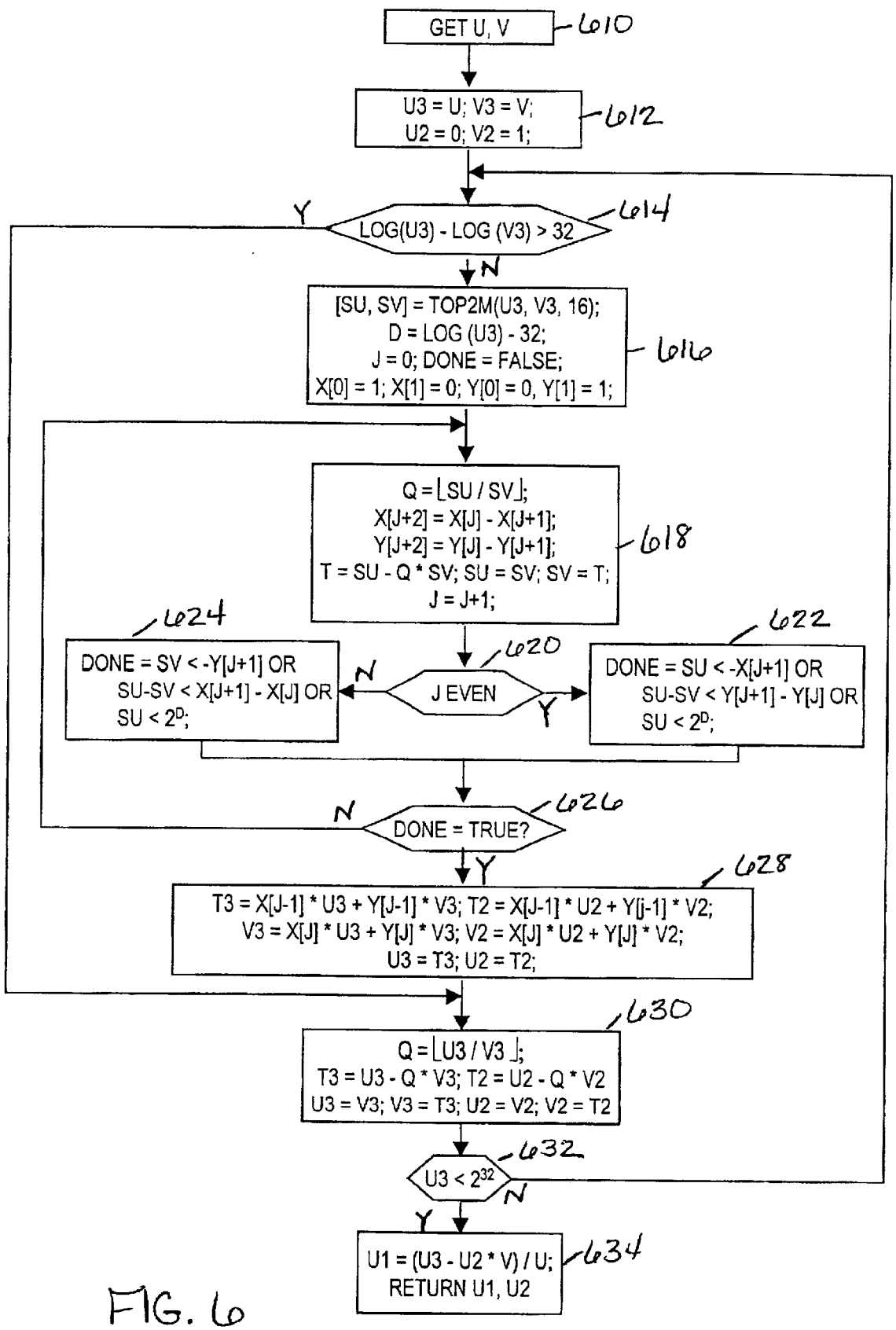
FIG. 6 is a flow-chart diagram of a modified Lehmer GCD algorithm which may be used by the CALCULATE-XY process shown in FIG. 5.
Figure 7:
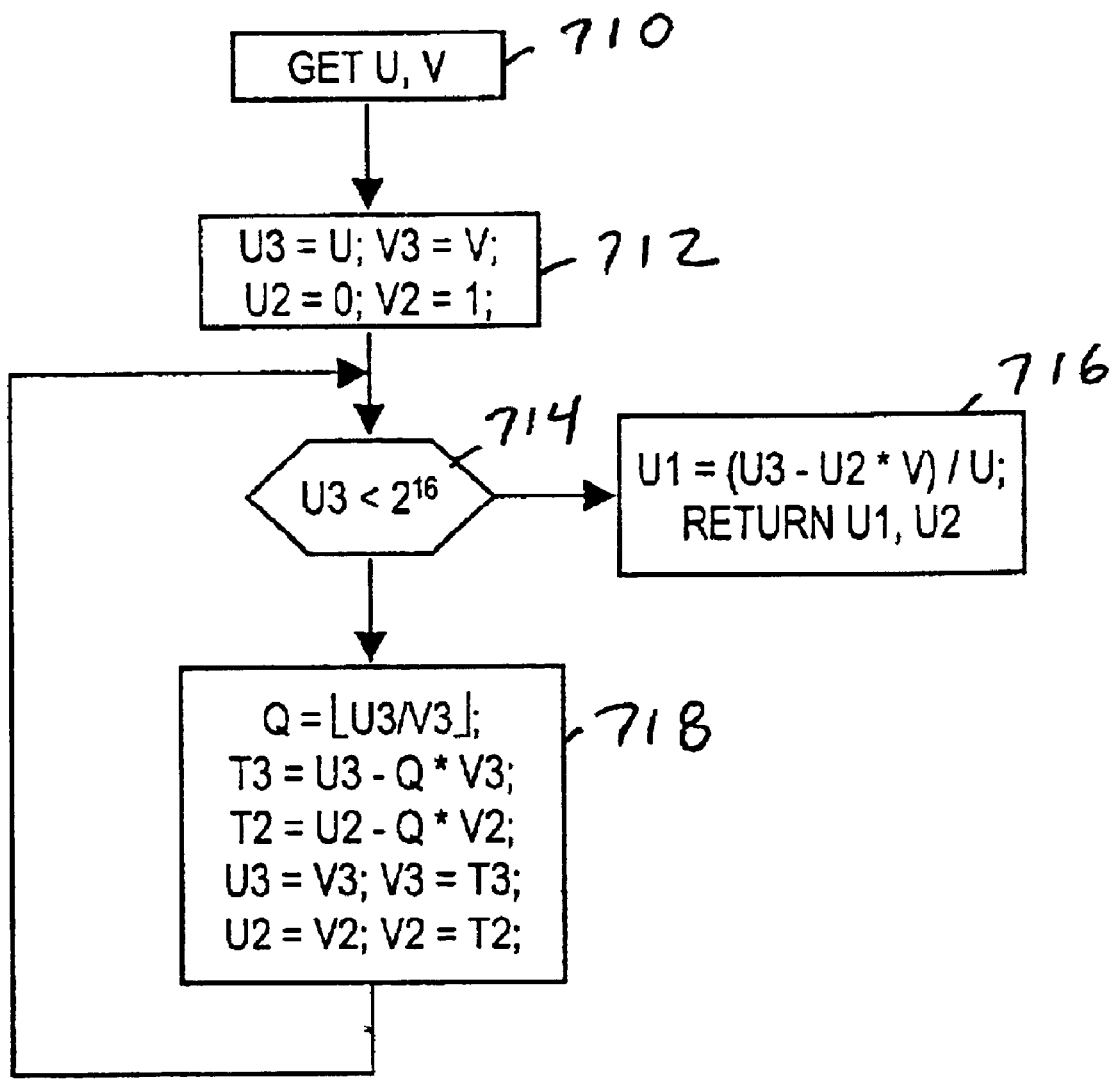
FIG. 7 is a flow-chart diagram of a modified Euclid GCD algorithm that may be used by the CALCULATE-XY process shown in FIG. 5.

In step 434, the calculation of X and Y such that $XA+YB<2^M$ is performed using the routine COMPUTE-XY, shown in FIG. 5. As described in more detail below, the routine COMPUTE-XY invokes one of two GCD algorithms. If M equals 16, a modified version of the Euclid algorithm, shown in FIG. 7, is used. If M equals 32, a modified Lehmer algorithm, shown in FIG. 6, is used.

The inventor has determined that using the Lehmer algorithm when M equals 32 has a significant effect on the speed at which the GCD and inverse (if the inventive GCD routine computes inverses) is calculated. The speedup, relative to using the Euclid algorithm, varies from 20–39% when U and V are 160 bit numbers and roughly 16–26% when U and V are 256 bit numbers.

Referring to FIG. 5, the routine COMPUTE-XY begins at step 510 by obtaining the values A, B and M. As set forth above, this routine determines values for variables X and Y such that $XA+YB<2^M$. In the exemplary embodiment of the invention, M may be either 16 or 32. The next step in the process, step 512, determines if M is equal to 32. If it is then, at step 514 the process calls the modified Lehmer GCD routine described below with reference to FIG. 6 to obtain values for X and Y. If M is equal to 16 at step 512, then the process, at step 516, calls the modified Euclid GCD routine to obtain the values of X and Y. This routine is described below with reference to FIG. 7. After step 514 or step 516, the process returns the values of X and Y at step 518.

The modified Lehmer GCD algorithm is derived from the basic Lehmer-Euclid algorithm, which is described in an article by J. Sorenson entitled "An Analysis of Lehmer's Euclidean GCD Algorithm," *ACM International Symposium on Symbolic and Algebraic Computation (ISSAC)*, July 1995, pp 254–258. The algorithm described in the article calculates the GCD of U and V. It is modified for the subject invention to terminate as soon as U3 is less than $2^M$. FIG. 6 is a flow-chart diagram of this modified GCD algorithm.

At step 610 of FIG. 6, the process obtains the values U and V. Because the process shown in FIG. 6 is invoked from the CALCULATE X-Y routine (shown in FIG. 5) which is, itself invoked from the inventive GCD algorithm (shown in FIG. 4), the values U and V are the top 2M bits of the values being processed by the algorithm shown in FIG. 4. The modified Lehmer algorithm is used only when M equals 32 and, so, 2M equals 64. For the sake of consistency, the variable names used in the modified Lehmer algorithm are the same as those used in the Euclid algorithm (described above with reference to FIG. 2) and the same as those used in the inventive algorithm (described above with reference to FIG. 4). These variables, however, are local to the Lehmer algorithm; they are not the same as the variables of the same name that are used in the algorithm shown in FIG. 4.

After step 610, the next step in the modified Lehmer GCD process, step 612, assigns the values U and V to temporary variables U3 and V3, respectively. Also at step 612, the temporary variables U2 and V2 are initialized to zero and one, respectively. At step 614, the routine determines if the most significant non-zero bit in the value U3 differs from the most significant non-zero bit in the value V3 by more than 32. If this condition is true, control transfers to step 630, described below. Otherwise, control transfers to step 616. At step 616, the process initializes an inter-reduction step used by the Lehmer algorithm. This step sets temporary variables SU and SV to the top 32 bits of the current values of U3 and V3, respectively; sets a temporary variable D to the bit position of the most significant non-zero bit in U3 minus 32 (i.e. $\log_2$ (U3)–32); sets an index variable J to zero, a condition variable DONE to false; and initializes the first two entries in the arrays X and Y, setting X[0] and Y[1] to one and X[1] and Y[0] to zero.

At step 618, the process calculates a value Q as the greatest integer less than SU divided by SV. Next, step 618 assigns the value X[J]–X[J+1] to the array element X[J+2] and assigns the value Y[J]–Y[J–1] to the array element Y[J+1]. Also at step 618, the routine reduces SU by the inter-reduction number of bits (assigned to a temporary variable T) and switches the values of SU and SV. Finally at step 618, the routine increments the index variable J by one.

At step 620, the routine determines if J is even or odd. If it is even then the routine, at step 622, calculates a value for the Boolean variable DONE as (SU<–X[J+1]) or (SU–SV<Y[J–1]–Y[J]) or (SU<$2^D$). This last condition, (SU<$2^D$), is not a part of the Lehmer Euclid algorithm but is added to terminate the inter-reduction step when U3 is less than $2^M$. If J is even at step 620 then the process, at step 624, calculates a value for the Boolean variable DONE as (SV<–Y[J+1]) or (SU–SV<X[J–1]–X[J]) or (SU<$2^D$). After either step 622 or 624, the process tests the Boolean variable DONE. If it is true then control transfers to step 628, described below. If it is false control transfers to step 618 to perform another inter-reduction step.

Step 628 calculates updated values for U3 and U2, according to equations (7) and (8) assigning the values to temporary variables T3 and T2.

$$T3 = X[J-1]*U3 + Y[J-1]*V3 \qquad (7)$$

$$T2 = X[J-1]*U2 + Y[J-1]*V2 \qquad (8)$$

The routine also calculates new values for V3 and V2 according to equations (9) and (10).

$$V3 = X[J]*U3 + Y[J]*V3 \qquad (9)$$

$$V2 = X[J]*U2 + Y[J]*V2 \qquad (10)$$

Finally, the values in the temporary variables T3 and T2 are assigned to U3 and U2, respectively.

After step 628 or after step 614 if the difference in the number of bits in U3 and V3 is greater than 32, step 630 is executed. This step performs the same reduction step as the Euclid algorithm and then switches the values of U3 and V3 after reducing the number of bits in U3. Next, step 632 determines if U3 is less than $2^{32}$. If it is, the routine is done and the values U3 and U2 are returned as the values X and Y. If U3 is not less than $2^{32}$, then control transfers to step 614 to continue the inter-reduction steps until the test at step 632 is satisfied. When U3 is less than $2^{32}$ at step 632, step 634 is executed which calculates a value for U1 as (U3–U2*V)/U and returns the values U1 and U2 as the values X and Y. This is a relatively economical division as U exactly divides (U3–U2*V).

As set forth above, the modified Lehmer algorithm is used only when M equals 32 at step 512 of the CALCULATE-XY routine described above with reference to FIG. 5. When M equals 16, the inventive GCD algorithm uses a modified version of the Euclid GCD algorithm. This modified Euclid algorithm is shown in FIG. 7. Steps 710, 712 and 718 of this algorithm are identical to the respective steps 210, 212, 216 and 218, described above with reference to FIG. 2. The only differences between the two algorithms are in the termination condition at step 714 and the calculation of U1 and return of the values U1 and U2 at step 716. The modified Euclid GCD algorithm, terminates when U3 is less than $2^{16}$ rather than when V3 equals zero as in the algorithm shown in FIG. 2.

Thus, the GCD algorithm according to the present invention performs an approximate calculation using only the most significant 2M bits of U3 and V3 if the number of bits in U3 and V3 differ by more than a threshold value. If this condition is not met then the algorithm reduces the number of bits in U3 by invoking a modified GCD algorithm to calculate values X and Y such that XU3+YV3 is less than $2^M$. This step uses a simple GCD routine, such as the Euclid routine (modified to terminate when U3<$2^M$) when M equals 16 or a more complex GCD routine, such as the Lehmer method (also modified to terminate when U3<$2^M$) when M equals 32. The inventors have determined that this algorithm produces good results on values having a number of bits greater than or equal to 96.

Figure 8:
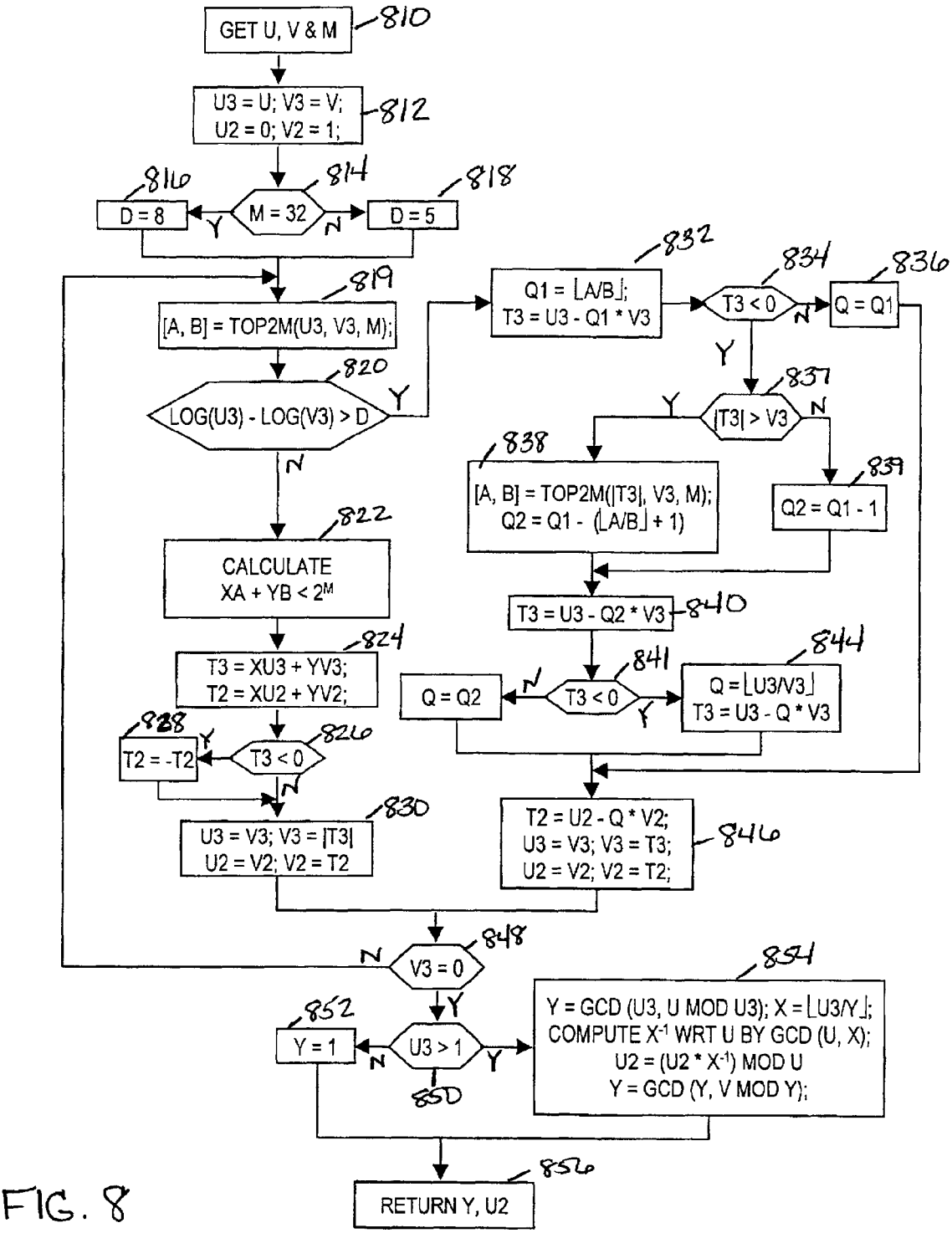
FIG. 8 is a flow chart diagram which illustrates the GCD algorithm shown in FIG. 4 including an inverse calculation.

One advantage that the inventive GCD algorithm has over other GCD algorithms is the speed at which it calculates inverses. The inventive algorithm described above with reference to FIGS. 4–7 does not calculate inverses. It only calculates GCD's. FIG. 8 shows a version of the inventive algorithm that also calculates inverses.

In FIG. 8, the algorithm begins at step 810 when it receives the values U, V and M. The next step, 812 sets the temporary variables U3 and V3 equal to U and V respectively, and initializes the variables U2 to zero and V2 to one. At step 814, the method tests the value of M. If M is 32, step 816 sets a temporary variable D to 8. If M is 16, step 818 sets D to 5.

At step 819, the process sets temporary variables A and B to be the top 2M bits of U3 and V3, respectively by invoking the routine TOP2M. This routine is described above with reference to FIG. 4A. This operation is done before branching between the reduction step and the inter-reduction step because the 2M most significant bits of U3 and V3 are used in both branches.

If, at step 820, the number of bits in U3 and V3 differ by more than D, the GCD algorithm according to the subject invention, at step 832, "approximately" calculates $\lfloor A/B \rfloor$ to generate an estimated value Q1 that is approximately equal to $\lfloor U3/V3 \rfloor$. Also at step 832, the process calculates a new value for T3 as U3 minus Q1 times V3. After step 832, the next step in the algorithm, step 834, tests T3 to determine if it is less than zero. If it is, then a correction step is implemented because T3 needs to be positive (i.e. Q1 does not equal $\lfloor U3/V3 \rfloor$).

In this instance, the algorithm performs a correction step by first determining, at step 837, if the absolute value of T3 is greater than V3. If it is, then at step 838, the process calls TOP2M to store the top 2M non-zero bits of the absolute value of T3 and the corresponding 2M bits of V3 into the respective temporary variables A and B. Also at step 838, the process calculates a new value Q2 as Q2=Q1−($\lfloor A/B \rfloor$+1).

If, at step 837, the absolute value of T3 is not greater than V3, then, at step 839, the value Q2 is calculated by simply subtracting one from Q1 at step 839. This correction is consistent with the correction performed in step 838, because, if the absolute value of T3 is less than V3, then $\lfloor T3/V3 \rfloor$ is zero.

After step 838 or 839, step 840 computes T3 as U3−Q2*V3 and, at step 841, determines if the newly calculated value of T3 is less than zero. Because the difference in the number of bits in U3 and the number of bits in V3 is almost always less than 16 when M=16, and less than 32 when M=32, The inventor has determined empirically that when Q1 does not equal $\lfloor U3/V3 \rfloor$, T3 is greater than zero and, thus, Q2 equals $\lfloor U3/V3 \rfloor$ over 99% of the time.

As in the algorithm shown in FIG. 4. when Q2 does not equal $\lfloor U3/V3 \rfloor$, the algorithm, at step 844 sets the variable Q equal to $\lfloor U3/V3 \rfloor$, calculated using all of the bits in U3 and V3, and then uses the value Q to calculate a new value for U3, storing it into the temporary variable T3. After step 834 if T3 is not less than zero then, at step 836, the algorithm assigns the value in Q1 to Q. Similarly, after step 841 if T3 is not less than zero, the process sets Q equal to Q2. At step 846, the algorithm completes the task of switching U3 and V3 and, at the same time, calculates a new value for U2, using Q, and switches the values of U2 and V2.

When, at step 820, the number of bits in V3 differs from the number of bits in U3 by D or less, the algorithm according to the subject invention, performs the inter-reduction step by computing X and Y such that XA+YB<$2^M$. At step 824, the algorithm then sets T3=XU3+YV3 and sets T2=XU2+YV2. Next, at step 826, the algorithm tests T3 to determine if it is less than zero. If it is, the sign of T2 is switched at step 828. After step 826 or 828, step 830 is executed. This step completes the switching of U3 and V3 and the switching of U2 and V2 by assigning V3 to U3, assigning the absolute value of T3 to V3, assigning V2 to U2 and assigning T2 to V2.

After step 830 or 846, the algorithm, at step 848 tests V3 to determine if it is equal to zero. If it is not, control returns to step 820 to perform the next reduction step or inter-reduction step. When, at step 848, V3 is equal zero, step 850 is executed to determine if U3 is greater than 1. If U3 is greater than 1, then the result may include spurious factors. The algorithm removes these factors at step 854 by setting a temporary variable Y equal to GCD (U3, U MOD U3), setting a temporary variable X equal to $\lfloor U3/Y \rfloor$ and then calculating the inverse of X with respect to U by using a GCD algorithm. Also at step 854, the process corrects U2 by multiplying U2 by the $X^{-1}$ modulo U. The process also removes the spurious factors from the GCD value, currently stored in the variable Y by setting Y equal to the GCD (Y, V mod Y). The GCD algorithms used in this step may be any GCD algorithm, including the inventive GCD algorithm or the Euclid algorithm described above with reference to FIG. 2 because the inventors have determined that, most of the time, the number of bits in U3 is less than 2M, thus, these GCD calculations only rarely need to use multi-precision arithmetic.

The use of the approximate division in the inventive GCD algorithm provides a significant advantage over other methods. The inventor has determined that adding this step to the inventive algorithm increases its performance by approximately 35 percent when operating on 160-bit numbers and by approximately 32 percent when operating on 256-bit numbers.

If, at step 850, U3 is found to be equal to 1, then no spurious factors exist and, at step 852, the temporary variable Y is set to 1. At step 856, after step 852 or step 854, the algorithm returns the value Y as the result of the GCD calculation and the value U2 as the inverse of V with respect to U. Note that when calculating the inverse it is desirable to calculate U2 mod U because U2 may be greater than U upon termination. This occurs because V2 grows by log(Y)+ log(Q) bits per iteration while U3 and V3 are reduced by approximately (M−1+log(Q)) bits every other iteration, where log(Y) is less than or equal to M−1. Consequently, log(U2)<2*log(U).

Although the inventive method for identifying the GCD of two numbers has been described in terms of applying a single algorithm, it is contemplated that two or more GCD routines may be combined in a single calculation. One such combination would be to invoke the Lehmer-Euclid routine as soon as the number of bits in U3 becomes less than or equal to 64.

The GCD routines may be further optimized by analyzing the processors that execute the routines. If, for example, an Intel Pentium II™ microprocessor is used, the algorithm may be optimized based on the methods used to perform 32 and 64 bit operations and on the type of variable that is used to hold the values. For example, although the Microsoft C++ compiler version 6.0 supports 64-bit multiplications, the Pentium II processor does not, only the lower 64 bits of the result are returned. This "feature" of the Pentium II processor may be exploited to perform a multiplication modulo $2^{64}$. Furthermore, the inventor has determined that dividing 64-bit integers is more efficient than dividing 32-bit integers for the amount of reduction gained. Division of double precision values, however, is even more efficient.

As described above, the inventive GCD algorithm may be applied in cryptography and integer factoring. The GCD algorithm without the inverse calculations may be applied to find the factors of a number or to help determine if a number is prime and, thus, to define a Finite field suitable for use in a data encryption operation. The GCD algorithm with the inverse calculation may be used to identify mathematical inverses of values in the Finite field in order to replace a relatively expensive multiprecision division operation by a simpler multiplication operation.

Multiprecision division is used, for example in the elliptic curve encryption algorithm. In this algorithm, a decoding key is identified by repeatedly adding a large number over a group of numbers that are defined by an elliptic curve in a Finite field. Because the addition is along the curve, it is not a simple process but requires a division step. In general, the addition of values in elliptic curve cryptography is defined by equations (11) through (14). All of these operations are modulo P where P is the large prime number that defines the Finite field.

$$(x1, y1)+(x2, y2)=(x3, y3) \quad (11)$$

$$x3=L^2-x1-x2 \quad (12)$$

$$y3=L(x1-x3)-y1 \quad (13)$$

$$L=(y1-y2)/(x1-x2) \quad (14).$$

Thus, to find an encryption key in an elliptic curve cryptographic system, one would perform a division step, as shown in equation (14). This may be simplified according to the present invention by calculating (x1−x2) and then invoking the inventive GCD routine to determine the inverse of the calculated value, modulo P.

Although the invention has been described in terms of exemplary embodiments, it is contemplated that it may be practiced with variations within the scope of the appended claims.

What is claimed:

1. A method for identifying an encryption value in a Finite field, $F_P$, where P is a prime number, based on a private key PV and a received public key PB, comprising the steps of:
   determining a mathematical inverse of PB modulo P by performing the steps of:

a) assigning P to a temporary variable U and assigning PB to a temporary variable V and assigning a value of zero to a temporary variable U2 and assigning a value of one to a temporary variable V2;

b) selecting 2M most significant bits of U as a first value $U_{2M}$ and selecting 2M most significant bits of V as a second value $V_{2M}$, dividing $U_{2M}$ by $V_{2M}$ and storing an integer portion of the result as a value Q;

c) determining a value T as U minus the quantity Q times V;

d) if T is less than zero, applying a correction term to Q to obtain a corrected value Q' and assigning the new value for T as U minus the quantity Q' times V;

e) determining a value T2 as U2 minus Q times V2, assigning the value in V2 to U2, assigning the value T2 to U2, assigning V to U and T to V; and f) repeating steps a) through e) until V equals zero, whereby the value remaining in U2 is the mathematical inverse of PB; and dividing PV by PB modulo P by multiplying PV times the mathematical inverse of PB, wherein the result is the encryption value.

2. A method according to claim 1, wherein:
   step d) includes the step of selecting 2M most significant bits of T to define a value $T_M$, wherein the step of applying the correction term is given by the equation:

$$Q'=Q-(\lfloor T_{2M}/V_{2M}\rfloor+1); \text{ and}$$

step d) further includes the step of calculating Q", a further corrected value for Q, as the greatest integer less than the quantity U divided by V. If the new value of T is less than zero.

3. A method according to claim 1, wherein the variable U has a most significant bit at bit-position B1 and the variable V has a most significant bit at bit-position B2, where B1 and B2 are integers and B1 is greater than B2, the method further including the steps of:
   subtracting B2 from B1 to obtain a difference value D;
   comparing D to a predetermined threshold value wherein steps a) through d) are performed only if D is greater than a predetermined threshold value;
   if D is not greater than the predetermined threshold, then, before step e) performing the steps of:
      determining values X and Y such that $U_{2M}$ times X plus $V_{2M}$ times V is less than $2^M$;
      assigning a new value to U as U times X plus Y times V and determining the value T2 as X times U2 plus Y times V2; and
   switching the values of U and V and assigning the value of V2 to U2 and assigning the value T2 to U2.

4. A method according to claim 3, wherein the step of determining values X and Y such that $U_{2M}$ times X plus $V_{2M}$ times Y Is less than $2^M$, includes the step of invoking a further GCD routine.

5. A method according to claim 3, wherein 2M equals 32 and the further GCD routine is a Euclid routine having a modified termination condition.

6. A method according to claim 3, wherein 2M equals 64 and the further GCD routine is a Lehmer routine having a modified termination condition.

7. A method for identifying an encryption value in an elliptic curve cryptographic system, the method comprising the steps of:
   Calculating the encryption value, (x3, y3), according to the equation $(x1, y1)+(x2, y2)=(x3, y3)$, where $x3 = L^2 - x1 - x2$; $y3 = L(x1-x3) - y1$ and $L = (y1-y2)/(x1-x2)$, where $(x1, y1)$ and $(x2, y2)$ represent input values to the elliptic curve cryptographic system and L is an intermediate value, wherein the method includes the step of determining a mathematical inverse of $(x1-x2)$ modulo a prime number by performing the steps of:
 a) assigning the prime number to a temporary variable U and assigning a first calculated value, $(x1-x2)$, to a temporary variable V and assigning a value of zero to a temporary variable U2 and assigning a value of one to a temporary variable V2;
 b) selecting 2M most significant bits of U as a first value $U_{2M}$ and selecting 2M most significant bits of V as a second value $V_{2M}$, dividing $U_{2M}$ by $V_{2M}$ and storing an integer portion of the result as a value Q;
 c) determining a value T as U minus the quantity Q times V;
 d) if T is less than zero, applying a correction term to Q to obtain a corrected value Q' and assigning the new value for T as U minus the quantity Q' times V;
 e) determining a value T2 as U2 minus Q times V2, assigning the value in V2 to U2, assigning the value T2 to U2, assigning V to U and T to V; and
 f) repeating steps a) through e) until V equals zero, whereby the value remaining in U2 is the mathematical inverse of the first calculated value; and dividing a second calculated value, $(y1+y2)$, by the first calculated value modulo the prime number by multiplying the second calculated value times the mathematical inverse of the first calculated value to obtain the intermediate value, L.

8. A method according to claim 7, wherein:
 step d) includes the step of selecting 2M most significant bits of T to define a value $T_M$, wherein the step of applying the correction term is given by the equation:

$$Q' = Q - (\lfloor T_{2M}/V_{2M} \rfloor + 1);$$ and step d) further includes the step of calculating Q", a further corrected value for Q, as the greatest integer less than the quantity U divided by V if the new value of T is less than zero.

9. A method according to claim 7, wherein the variable U has a most significant bit at bit-position B1 and the variable V has a most significant bit at bit-position B2, where B1 and B2 are integers and B1 is greater than B2, the method further including the steps of:

subtracting B2 from B1 to obtain a difference value D;

comparing D to a predetermined threshold value wherein steps a) through d) are performed only if D is greater than a predetermined threshold value;

if D is not greater than the predetermined threshold, then, before step e) performing the steps of:
  determining values X and Y such that $U_{2M}$ times X plus $V_{2M}$ times Y is less than $2^M$;
  assigning a new value to U as U times X plus Y times V and determining the value T2 as X times U2 plus Y times V2; and
  switching the values of U and V and assigning the value of V2 to U2 and assigning the value T2 to U2.

10. A method according to claim 9, wherein the step of determining values X and Y such that $U_{2M}$ times X plus $V_{2M}$ times Y is less than $2^M$, includes the step of invoking a further GCD routine.

11. A method according to claim 9, wherein 2M equals 32 and the further GCD routine is a Euclid routine having a modified termination condition.

12. A method according to claim 9, wherein 2M equals 64 and the further GCD routine is a Lehmer routine having a modified termination condition.

* * * * *